US012782268B2

(12) United States Patent
Waclawek et al.

(10) Patent No.: US 12,782,268 B2
(45) Date of Patent: Nov. 3, 2026

(54) BALANCED-DETECTION INTERFEROMETRIC CAVITY-ASSISTED PHOTOTHERMAL SPECTROSCOPY WITHIN A SINGLE CAVITY

(71) Applicant: TECHNISCHE UNIVERSITÄT WIEN, Vienna (AT)

(72) Inventors: Johannes Paul Waclawek, Vienna (AT); Bernhard Lendl, Vienna (AT)

(73) Assignee: TECHNISCHE UNIVERSITÄT WIEN, Vienna (AT)

( * ) Notice: Subject to any disclaimer, the term of this patent is extended or adjusted under 35 U.S.C. 154(b) by 111 days.

(21) Appl. No.: 18/692,558

(22) PCT Filed: Sep. 16, 2022

(86) PCT No.: PCT/EP2022/075823
§ 371 (c)(1),
(2) Date: Mar. 15, 2024

(87) PCT Pub. No.: WO2023/041731
PCT Pub. Date: Mar. 23, 2023

(65) Prior Publication Data

US 2025/0130161 A1 Apr. 24, 2025

(30) Foreign Application Priority Data

Sep. 17, 2021 (AT) .............................. A 50732/2021

(51) Int. Cl.
*G01N 21/17* (2006.01)
*G01N 21/39* (2006.01)

(52) U.S. Cl.
CPC ....... *G01N 21/171* (2013.01); *G01N 21/1717* (2013.01); *G01N 21/39* (2013.01);
(Continued)

(58) Field of Classification Search
CPC .. G01N 21/171; G01N 21/1717; G01N 21/39; G01N 2021/1704; G01N 2021/1714; G01N 2021/1731
See application file for complete search history.

(56) References Cited

U.S. PATENT DOCUMENTS

2019/0195781 A1 * 6/2019 Waclawek ......... G01N 21/4133

FOREIGN PATENT DOCUMENTS

WO 2018/009953 A1 1/2018

OTHER PUBLICATIONS

“Balanced-detection interferometric cavity-assisted photothermal spectroscopy employing an all-fiber-coupled probe laser configuration”, Vienna University of Technology—Tu Wien, vol. 29, No. 5, Feb. 26, 2021 (Feb. 26, 2021), by Waclawek Johannes P. et al . (Year: 2021).*

(Continued)

*Primary Examiner* — Jamil Ahmed
(74) *Attorney, Agent, or Firm* — Greer, Burns & Crain, Ltd

(57) ABSTRACT

A method and corresponding apparatus for detecting a molecule, in particular a trace gas species, in a sample using photothermal spectroscopy including the steps of

- providing a probe laser beam and propagating the probe laser beam to a cavity of a Fabry-Perot interferometer
- directing the probe laser beam through the sample in the cavity
- providing an excitation laser beam for heating the sample in the cavity
- directing the excitation laser beam through the sample in the cavity
- detecting the transmitted probe laser beam, which was transmitted from the cavity and (Continued)

detecting the reflected probe laser beam, which was reflected from the cavity.

18 Claims, 10 Drawing Sheets

(52) U.S. Cl.
CPC ................ *G01N 2021/1704* (2013.01); *G01N 2021/1714* (2013.01); *G01N 2021/1731* (2013.01)

(56) References Cited

OTHER PUBLICATIONS

International Search Report and Written Opinion received for PCT/EP2022/075823, mailed Dec. 9, 2022.
Waclawek, J., et al., “Balanced-detection interferometric cavity-assisted photothermal spectroscopy employing an all-fiber-coupled probe laser configuration,” Optics Express, vol. 29, No. 5, Mar. 2021, pp. 7794-7808.
Waclawek, J., et al., “2f-wavelength modulation Fabry-Perot photothermal interferometry,” Optics Express, vol. 24, No. 25, Dec. 12, 2016, pp. 28958-28967.
Waclawek, J., et al., “Balanced-detection interferometric cavity-assisted photothermal spectroscopy,” Optics Express, vol. 27, No. 9, Apr. 29, 2019, pp. 12183-14195.
Krzempek, K., “A Review of Photothermal Detection Techniques for Gas Sensing Applications,” Applied Sciences 9, No. 2826, 2019, 19 pages.

* cited by examiner

BALANCED-DETECTION INTERFEROMETRIC CAVITY-ASSISTED PHOTOTHERMAL SPECTROSCOPY WITHIN A SINGLE CAVITY

FIELD OF THE INVENTION

The present invention concerns a method for detecting a molecule, in particular a trace gas species, in a sample using photothermal spectroscopy comprising the steps of:

- providing a probe laser beam and propagating the probe laser beam to a cavity of a Fabry-Perot interferometer;
- directing the probe laser beam through the sample in the cavity;
- providing an excitation laser beam for heating the sample in the cavity;
- directing the excitation laser beam through the sample in the cavity;
- detecting the transmitted probe laser beam, which was transmitted from the cavity.

Further, the present invention concerns a photothermal interferometry apparatus for detecting a molecule in a sample, in particular for detecting a trace gas species, comprising:

- a Fabry-Perot interferometer with a first partially reflective mirror, a second partially reflective mirror and a cavity for containing the sample extending between the first mirror and the second mirror;
- a probe laser for providing a probe laser beam;
- an excitation laser for passing an excitation laser beam through the cavity such that it intersects with the probe laser beam in the cavity for exciting the molecule in the sample;
- a first photodetector arranged for detecting a transmitted probe laser beam, which was transmitted from the cavity.

BACKGROUND

The selective quantification of various gas species at trace levels is critical in a variety of applications, including environmental monitoring, industrial process control, medical diagnostics, and scientific research. Powerful laser based gas sensors have been developed, however, further advances in sensitive and rugged operation of miniaturized sensors are still needed. Such sensor miniaturization plays a crucial role in certain areas that require a small absorption volume or small footprint, but still remains challenging to achieve. A small probe volume is beneficial for monitoring rapidly changing concentration levels in gas streams, due to the capacity for rapid gas exchange and thus fast sensor response, or simply for applications where only limited sample gas volumes are available. The well-established gas quantification methods based on direct absorption spectroscopy, however, show an inherently limited miniaturization potential due to the dependence of the sensitivity on the optical path length according to the Lambert-Beer law. In contrast, methods based on indirect absorption spectroscopy, such as photothermal spectroscopy (PTS) and photoacoustic spectroscopy (PAS), offer the potential for sensor miniaturization and additionally feature the unique properties of a large dynamic range extending over a few orders of magnitude and a background-free sensor response. These indirect methods detect changes in the sample's thermodynamic properties, probing variations in the refractive index (PTS) and acoustic waves (PAS), respectively. Indirect spectroscopic signals are typically induced by an excitation light source. The absorption of electromagnetic waves by molecules excites their internal energy levels, which may lead to sample heating via energy transfer by collisional relaxation. A change in the sample's temperature causes a change in density and pressure, generating the PTS and PAS signals. The photo-induced signal is directly proportional to the temperature change within the excited sample volume, which in turn is directly proportional to the concentration and absorption coefficient of the absorbing molecule as well as to the incident laser power, and inversely proportional to the modulation frequency and cross-section of the laser beam.

PTS sensing employing an interferometer as a transducer for monitoring photo-induced changes is a powerful approach for detection of trace gases. Corresponding photothermal interferometry (PTI) setups employ an excitation laser for transient sample heating and a probe laser to monitor the resulting refractive index changes. Any change in the refractive index causes a phase shift of the electromagnetic waves passing through the heated region, which can be measured simply by detection of the probe laser's intensity transmitted through the interferometer. Both, two-beam interferometers, such as the Mach-Zehnder or Jamin type, and multi-beam interferometers, such as the Fabry-Perot configuration, i.e., an optical cavity, have been applied to measure temperature-induced phase shifts of laser radiation. The fundamental sensitivity of a two-beam interferometer is dependent on the phase shift, whereas the sensitivity of a multi-beam interferometer is dependent on the phase shift as well as on the Finesse of the cavity, i.e., the reflectivity of its mirrors, each of which can be adjusted separately. Thus, the very simple configuration of the optical cavity enables the possibility for both highly sensitive and miniaturized transducers via a short interferometer spacing and moderately to highly reflective mirrors, as has been shown by interferometric cavity-assisted photothermal spectroscopy (ICAPS) (see: WO 2018/009953 A1; J. P. Waclawek, V. C. Bauer, H. Moser, and B. Lendl, "2f-wavelength modulation Fabry-Perot photothermal interferometry," Opt. Express 24, 28958-28967 (2016); J. P. Waclawek, C. Kristament, H. Moser, and B. Lendl, "Balanced-detection interferometric cavity-assisted photothermal spectroscopy," Opt. Express 9, 12183-12195 (2019); J. P. Waclawek, H. Moser, and B. Lendl, "Balanced-detection interferometric cavity-assisted photothermal spectroscopy employing an all-fiber-coupled probe laser configuration," Opt. Express 29, 7794-7808 (2021)). The absence of any mechanical resonance allows the free selection of the modulation and hence the detection frequency. By this means, an optimum modulation frequency in terms of the maximum ratio of the photo-induced signal strength to noise can be selected, exploiting the inverse proportionality of indirect spectroscopy signals to modulation frequency. Moreover, the absence of any resonator renders frequent recalibration under changing environmental conditions unnecessary. The ICAPS sensing scheme has proven ability to provide white-noise-determined characteristics, resulting in excellent long-term stability due to feedback-controlled compensation of any transducer drifts. This allows improvement of sensitivity by application of very long integration times, which may be of special interest for applications where the concentration of the target molecule changes either very slowly or not at all.

A Fabry-Perot interferometer (FPI), i.e., an optical cavity, can be used to detect changes in the refractive index of a gaseous sample with high sensitivity by monitoring the phase shift of electromagnetic radiation passing through the device. Changes in the refractive index of the sample can be induced via photothermal excitation by inducing a temperature change. The induced temperature change causes the simultaneous generation of two waves, which both can be detected by a FPI: A heavily damped thermal wave with a wavelength in the sub-mm range and a slightly damped acoustic wave with a wavelength in the cm range, both altering the sample refractive index. Due to different damping coefficients and wavelengths the two waves are spatially separated and can be investigated independently. An FPI simply consists of two partially transmitting mirrors spaced at a certain distance. Monochromatic radiation entering the FPI is partially reflected by the input mirror. The transmitted intensity portion is further reflected between the two mirrors, forming an infinite series of partial waves in forward and backward direction. With each reflection, intensity is coupled out of the FPI in both directions. The periodic transmission, or resonances, of an ideal FPI is described by the Airy function, whose characteristic is dependent on the finesse of the optical cavity and on the phase difference for a cavity round trip. The finesse is only determined by the reflectivity of the two mirrors, whereas the phase difference is dependent on the vacuum wavelength, the angle of incidence, the spacing of the mirrors, and the refractive index of the medium between the mirrors. At the resonance frequencies, the transmittance of the cavity is maximized, while its reflectance is minimized. The beam that is transmitted through the FPI is the leakage beam, which is the part of the standing wave inside the cavity that leaks out of the second mirror. The reflected beam, however, is the sum of two different beams: the part that is promptly reflected by the first mirror and the part that is leaking out of the cavity through the first mirror traveling in backward direction. The relative phase of these two parts strongly depends on the laser frequency. If the laser frequency is perfectly matched to one resonance frequency of the cavity, the promptly reflected beam and the leakage beam are exactly 180 degrees out of phase, resulting in destructive interference. Any deviation from resonance will cause the phase difference to deviate from 180 degrees, and thus from complete destructive interference. The (forward) transmittance as well as the (backward) reflectance can be employed to detect changes in the refractive index of the gas inside the FPI. Detection of the (forward) transmitted beam has been shown in Waclawek et al (2016) and Waclawek et al (2019); Detection of the reflectance employing balanced-detection has been demonstrated in Waclawek et al (2021).

The ICAPS operation principle is essentially the same for the detection of both transmittance and reflectance. The periodic transmission of the interferometer is shifted with respect to the vacuum wavelength when the refractive index of the sample between the two mirrors changes due to photothermal heating. This shift is monitored via a photodiode as a change in the transmitted intensity, using a probe laser that is tuned to a frequency enabling partial transmission/reflectance. The highest sensitivity to variations in the phase difference is found near the inflection point on one side of the periodic resonances, at approximately 25% of the height of the function for reflectance and 75% for the transmittance, respectively.

The principal sources of excess noise in photothermal interferometry systems, in particular in an ICAPS system, are twofold:

excess probe laser noise, and environmental noise.

Excess probe laser noise arises from intensity and frequency fluctuations of the emitted probe laser radiation, the characteristics of which depend on the type of laser used. In addition, the driving conditions of the laser source influence noise content, e.g., lower driving currents may yield higher intensity noise, while a noisy driving source will translate directly into enhanced frequency noise. The dominating laser noise of a typical ICAPS setup detecting signals in the low kHz regime and employing a proper laser driver is intensity noise. Environmental noise may be introduced by acoustic and mechanical perturbations, which may induce on the one hand variations in the refractive index of the media inside the cavity due to pressure changes, and on the other hand minute variations in the cavity geometry, both of which affect the transmission function characteristics. This kind of noise can be effectively excluded by using a proper sensor housing. Any noise is ultimately detected by the photodiode as intensity fluctuation. Frequency noise as well as environmental noise will be enhanced proportionally to the slope of the periodic transmission of the cavity. Intensity noise will not be affected by the cavity properties, as it is only a measure of the probe laser.

Any enhancement in sensitivity by an optical cavity, however, is only directly proportional to the point at which the source of limiting noise (excess noise) is not also proportionally enhanced. The susceptibility to excess noise is a potential drawback of the basic PTI scheme using an optical cavity. An improvement in terms of sensitivity as well as robustness of an ICAPS system is obtained by cancellation of excess noise via employment of a balanced-detection scheme. Within this scheme excess noise can be removed with high efficiency, by simultaneously comparing the probe laser's intensity with and without the photothermal signal. The concept of conventional balanced-detection ICAPS (BICAPS) using an all-fiber coupled probe laser configuration detecting the photothermal signal via reflectance was presented in Waclawek et al (2021). The probe beam is split by a beam splitter into two equal beams—a sample probe beam and a reference probe beam. The beams are then coupled into two separate cavities (a sample and reference cavity), having identical properties within the gas cell. The sample probe beam intersects the excitation beam and propagates through the photo-induced heated region of the sample, where it undergoes refractive index variations caused by the thermal wave. The signal of the sample probe beam carries the photothermal signal, which is superimposed by noise originating from various sources. In contrast, the reference probe beam only probes system noise due to the lack of any photothermal excitation. The reflectance of the interferometers is detected by two separate photodiodes. The backward traveling light is collected by the collimator and separated from the forward traveling light coming from the laser source via an optical circulator. The signals of the two photodiodes are subtracted by a differential amplifier, enabling cancellation of identical noise present in both parts with high rejection ratio. An important aspect in this regard is that identical characteristics of the two cavities are essential in order to yield the same excess noise response in both probe channels. Identical characteristics include identical optical and mechanical configurations as well as presence of the same sample gas with the same properties, such as composition, pressure, and temperature. This is of particular relevance when rapid changes may occur in the target molecule and/or matrix. Disadvantageously, this requires a complex setup, and the requirement for identical characteristics of the two cavities is a potential source of error. Indeed, cavity drift may lead to additional noise.

It is an objective of the present invention to alleviate or eliminate at least one of the drawbacks of the prior art. In particular, it is an objective of the present invention to provide a photothermal interferometry system that has a reduced system complexity, is stable against cavity drifts and/or provides an enhancement in the signal-to-noise ratio.

SUMMARY

This is achieved by a method as mentioned in the outset, further comprising the step:

detecting the reflected probe laser beam, which was reflected from the cavity.

This is also achieved by a photothermal interferometry apparatus as mentioned in the outset, further comprising:

a second photodetector arranged for detecting a reflected probe laser beam, which was reflected from the cavity.

The probe laser beam intersects with the excitation laser beam in the cavity and propagates through the photo-induced heated region of the sample, where it undergoes refractive index variations caused by the thermal wave. The standing wave formed by the probe laser beam inside the cavity is leaking out on both side of the cavity: the one where it was coupled into the cavity and the opposite side. Both of these output beams are detected. The reflected probe laser beam and the transmitted probe laser beam carry the photothermal signal with opposed sign but identical intensity noise, in particular when the probe laser frequency is tuned to partial transmission on one side of the cavity resonance. The resonance of the interferometer is shifted with respect to the vacuum wavelength identically for both the transmittance and reflectance, but the detected signal for the transmitted and reflected beam is exactly opposed due to the inverted shape of the resonance profile of the transmittance and reflectance. Thereby, detection of both the reflected probe laser beam and the transmitted probe laser beam allows the cancellation of intensity noise in both parts with a high rejection ratio down to the fundamental limit of shot noise.

Advantageously, the method and apparatus of the present invention require only one single cavity, thereby reducing the system complexity compared to balanced-detection ICAPS as described in Waclawek et al (2019) and Waclawek et al (2021), which require two identical cavities for noise cancellation.

For efficient noise reduction down to the fundamental shot noise limit same intensity levels of the two detected probe laser beams are essential. Any imbalance within the two channels causes a decreased noise cancellation performance and the shot noise limit is only accessible for identical voltage levels in both channels. In a conventional balanced-detection ICAPS system (as described in Waclawek et al (2019) and Waclawek et al (2021)) identical intensities may be difficult to achieve, due to individual drifts of the transmission frequencies of the individual cavities e.g. by temperature, requiring e.g. a temperature control of the cavity's to avoid such drifts and to keep the intensities of the two channels as similar as possible. However, this is not the case for the method and apparatus of the present invention within a single cavity: Since this method uses the same cavity for noise cancellation the reflected and transmitted output will respond identically to any drift of the cavities transmission frequency. Since both detected beams originate from the same cavity, there is no influence of a cavity drift, and the signal-to-noise ratio is enhanced.

Common mode intensity noise can be cancelled down to the fundamental limit of shot noise, which yields an improved noise level compared to ICAPS not using a balanced-detection scheme (e.g. Waclawek et al (2016)). Furthermore, according to the present invention, the photothermal signal is detected in both channels. Therefore, the output (e.g. when differentially amplified) will yield an increased signal-to-noise ratio of 6 dB (factor 2) compared to the conventional balanced-detection ICAPS scheme (e.g. Waclawek et al (2019) and Waclawek et al (2021)), where the photothermal signal is only present in one path.

The present invention may only be capable of rejection of intensity noise within the two paths. However, in most cases intensity noise is the dominant noise source in photothermal interferometry system, in particular an ICAPS system, whereas often frequency noise can be excluded by using an adequate lasers source and an adequate housing of the sensor.

The transmitted probe laser beam refers to the probe laser beam that leaks out of the cavity at the side opposite to the side at which the probe laser beam was introduced into the cavity. The reflected probe laser beam refers to the probe laser beam that was reflected on being coupled into the cavity and the probe laser beam that leaks out of the cavity at the same side as where it was coupled into the cavity. Thus, e.g. in case the probe laser beam is directed at the cavity at the first mirror, the reflected probe laser beam is the sum of the following two different beams: the part that is promptly reflected by the first mirror and the part that is leaking out of the cavity through the first mirror (traveling in backward direction). In this case, the transmitted probe laser beam is the part that is leaking out of the cavity through the second mirror.

In the cavity, the probe laser beam passes through the sample (containing the molecule of interest, i.e. the analyte) heated by the excitation laser beam such that both the transmission and the reflectance of the probe laser beam is influenced by the heating of the sample with the excitation laser beam. The sample is optionally gaseous.

The first photodetector and the second photodetector are each preferably a photodiode. The first photodetector and the second photodetector may each comprise a transimpedance amplifier (TIA) for amplifying their respective signal.

In particular, the apparatus is configured for conducting the method according to any of the variants described herein. Optionally, the apparatus comprises a control device configured for controlling the (remaining) apparatus for conducting the method according to any of the variants described herein.

Optionally, the probe laser beam emission frequency is maintained at the operation point of the cavity's resonance, e.g. via a slow feedback circuit (e.g. in the mHz range). For this purpose, the DC component of the first photodetector (detecting the transmitted probe laser beam) and/or of the second photodetector (detecting the reflected probe laser beam) can be used. By monitoring the DC-component and adjusting the probe laser frequency, any drift of the senor response, e.g., due to temperature or changing sample (gas) composition, or drift of the emitted probe laser frequency itself may be automatically compensated.

Optionally, the probe laser beam propagating to the cavity is separated from the reflected probe laser beam by an optical circulator. I.e., the probe laser beam propagates from the probe laser to the cavity via the optical circulator and the reflected probe laser beam propagates from the cavity to the location of its detection (i.e. the second photodetector) via the same optical circulator. The optical circulator may be fibre-integrated.

Optionally, the probe laser beam is propagated to the cavity at least in a section in an optical fibre. The use of fibres may greatly improve the ruggedness by (at least partially) avoiding free-space probe laser beams.

Optionally, the probe laser beam propagating to the cavity is coupled into the cavity by a fibre-coupled collimator and the reflected probe laser beam is collected by the same fibre-coupled collimator. This allows precluding any mismatch in the probe laser beam guiding at the interferometer coupling/collecting interface. In particular, the reflected probe laser beam is collected by the same coupler which is used to couple the probe laser beam into the cavity.

Optionally, the method further comprises tuning the probe laser beam to a frequency, at which the transmitted probe laser beam and the reflected probe laser beam have the same power.

Optionally, the method further comprises the step of subtracting a transmitted signal corresponding to the transmitted probe laser beam and a reflected signal corresponding to the reflected probe laser beam (or vice versa). Preferably, the transmitted signal and the reflected signal are differentially amplified. Since the two signals carry the photothermal signal with opposed sign, but identical intensity noise, this allows cancellation of the intensity noise. Prior to being subtracted (in particular differentially amplified), the reflected signal and the transmitted signal (in particular the electronic outputs of the first and the second photodetector) may each be passed to a high-pass filter. The high pass filter may e.g. have a 3 dB cut-off frequency of 200 Hz. The differential amplifier used may be a low-noise differential amplifier, preferably with a gain of more than 10, e.g. with a gain of 100. The output of the differential amplifier may be fed into a lock-in amplifier (LIA).

Optionally, the method further comprises the steps of:

adjusting the transmitted probe laser beam by a first attenuator and/or the reflected probe laser beam by a second attenuator preferably such that the transmitted probe laser beam and the reflected probe laser beam have the same power, prior to detecting the transmitted probe laser beam and the reflected probe laser beam. In this way, e.g. saturation of the detectors can be avoided. For example, variable attenuators can be used to adjust the attenuation such that the resonance profile can be detected by the first and/or second photodetector while avoiding oversaturation.

Optionally, the method further comprises the step of:

tuning the probe laser beam to a partial transmittance or a partial reflectance of one side of a resonance of the cavity. In particular, the probe laser beam can be frequency tuned to be at one of the inflection points of the resonance of the cavity. In this way, a maximum response to an excitation can be detected.

Optionally, the method comprises the steps of:

modulating the excitation laser beam wavelength, wherein the modulated excitation laser beam is directed through the sample in the cavity;

detecting a harmonic, in particular a second harmonic, of a modulation of the transmitted probe laser beam and detecting a harmonic, in particular a second harmonic, of a modulation of the reflected probe laser beam.

Optionally, the method further comprises the steps of:

providing a further probe laser beam and propagating the further probe laser beam to a further cavity of the Fabry-Perot interferometer;

directing the further probe laser beam through the sample in the further cavity;

detecting the transmitted further probe laser beam, which was transmitted from the further cavity;

detecting the reflected further probe laser beam, which was reflected from the further cavity. In case frequency and/or environmental noise is the limiting noise of the method/system, the scheme of single-cavity balanced-detection ICAPS is thereby extended by applying two separate cavities in order to cancel frequency and environmental noise. This extension occurs at cost of system complexity, however, enables noise reduction down to the fundamental limit of shot noise and furthermore enhances the detected signal compared to conventional balanced-detection ICAPS. The sample at which the further probe laser beam is directed in the further cavity is the same sample as in the cavity. In particular, the excitation laser beam is not directed at the sample in the further cavity, i.e. the further probe laser beam passes the excitation laser beam in the further cavity. The further probe laser beam may be considered a reference probe laser beam, whereas the probe laser beam may be considered a sample probe laser beam. Preferably, a beam from the probe laser is split by a beam splitter for providing both the (sample) probe laser beam and the further (reference) probe laser beam. Optionally, the method comprises the step of subtracting a further transmitted signal corresponding to the transmitted further probe laser beam and a further reflected signal corresponding to the reflected further probe laser beam (or vice versa). Optionally, the method comprises subtracting the difference of the further transmitted signal and the further reflected signal from the difference of the transmitted signal and the reflected signal (or vice versa).

For this purpose, the apparatus optionally comprises:

the Fabry-Perot interferometer comprises a further first partially reflective mirror, a further second partially reflective mirror and a further cavity for containing the sample extending between the further first mirror and the second further mirror;

a beam splitter, for providing for the further probe laser beam from the probe laser;

a first further photodetector arranged for detecting a transmitted further probe laser beam, which was transmitted from the further cavity;

a further second photodetector arranged for detecting a reflected further probe laser beam, which was reflected from the further cavity.

Optionally, the first mirror and the further first mirror are provided by the same first mirror element and/or the second mirror and the further second mirror are provided by the same second mirror element.

Referring to the apparatus, optionally it comprises an optical circulator arranged for directing the probe laser beam from the probe laser to the cavity and for directing the reflected probe laser beam from the cavity to the second photodetector. The optical circulator is in particular fibre-integrated.

Optionally, the apparatus comprises an optical fibre which is arranged for at least in a section propagating the probe laser beam from the probe laser to the cavity.

Optionally, the apparatus comprises a fibre-coupled collimator for coupling the probe laser beam into the cavity and for collecting the reflected probe laser beam.

Optionally, the Fabry-Perot interferometer comprises a sample cell for containing the sample, the first and the second mirror being fixed on a first and second side of the sample cell, wherein optionally the sample cell comprises a sample inlet and a sample outlet. If the apparatus comprises a further cavity, the further first mirror and the further second mirror may be fixed on the first and second side of the sample cell, respectively.

Optionally, the apparatus comprises a subtractor, in particular a differential amplifier, for subtracting (in particular differentially amplifying) a transmitted probe laser signal detected by the first photodetector and a reflected probe laser signal detected by the second photodetector.

Optionally, the apparatus comprises a first attenuator arranged in the path of the transmitted probe laser beam between the cavity and the first photodetector and/or a second attenuator arranged in the path of the reflected probe laser beam between the cavity and the second photodetector, in particular arranged in the path of the reflected probe laser beam between the optical circulator and the second photodetector.

Optionally, the first attenuator is a fixed value attenuator or a variable value attenuator and/or the second attenuator is a fixed value attenuator or a variable value attenuator.

Optionally, the apparatus comprises a tuner for tuning the probe laser beam over a given wavelength range.

Optionally, the apparatus comprises:

a modulator for modulating the wavelength of the excitation laser beam, the first photodetector being arranged for detecting a modulation of the transmitted probe laser beam, the second photodetector being arranged for detecting a modulation of the reflected probe laser beam, a control unit arranged for communicating with the first photodetector and the second photodetector and arranged for determining a harmonic, in particular a second harmonic, of the modulation of the transmitted probe laser beam and the reflected probe laser beam, wherein the control unit optionally comprises a lock-in amplifier. The control unit may comprise a demodulator for detecting a nth harmonic of the transmitted and/or reflected probe laser beam. The control unit may comprise a lock-in amplifier. In this embodiment, the lock-in amplifier serves as demodulator for detecting a nth harmonic of the transmitted and/or reflected probe laser beam.

BRIEF DESCRIPTION OF THE DRAWINGS

The invention is further explained with respect to exemplary embodiments thereof.

DETAILED DESCRIPTION

Figure 1:
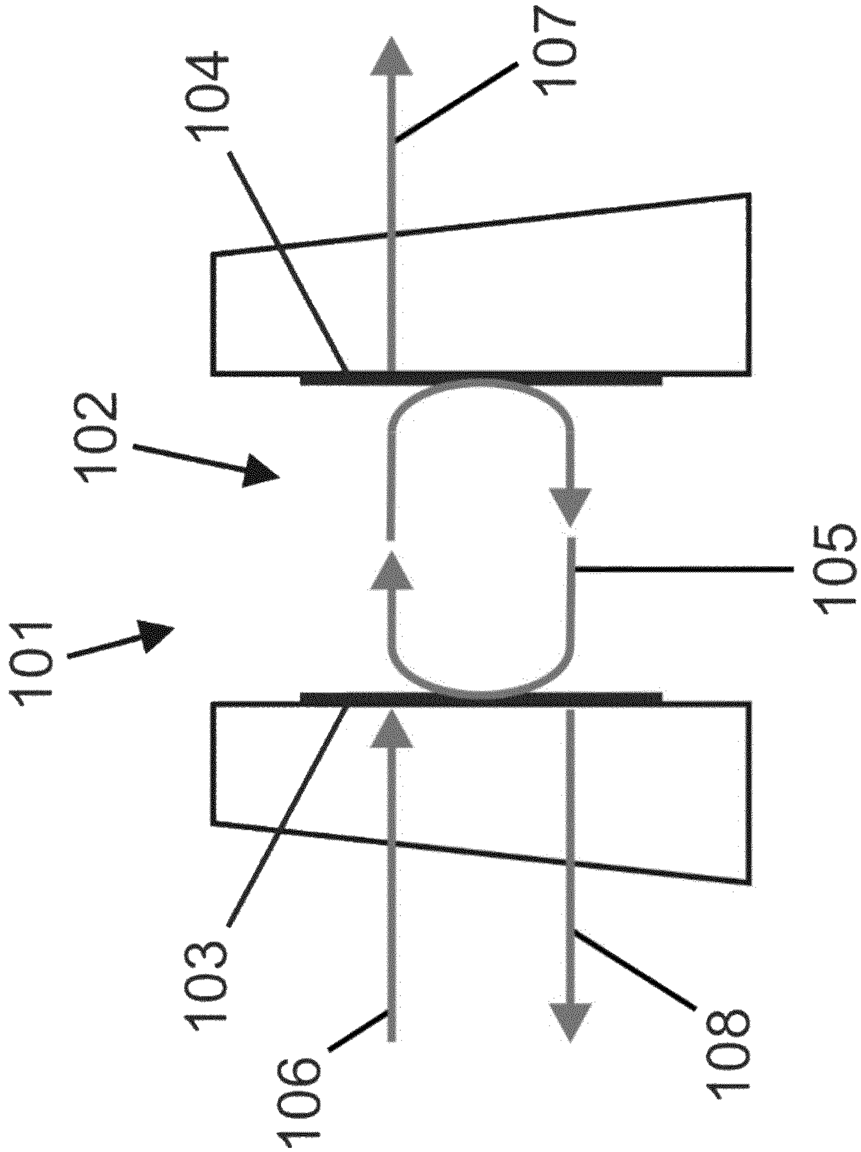
FIG. 1 schematically shows a Fabry-Perot interferometer.

FIG. 1 schematically shows a Fabry-Perot interferometer (FPI) 101 with a cavity 102 extending between an input mirror 103 and a second mirror 104, which are both partially transmitting and are spaced at a distance. Monochromatic radiation 106 entering the FPI 101 is partially reflected by the input mirror 103. The transmitted intensity portion is further reflected between the two mirrors 103, 104, forming an infinite series of partial waves in forward and backward direction and thus, a circulating beam 105. With each reflection, intensity is coupled out of the FPI in both directions, i.e. a transmitted beam 107 and a reflected beam 108 leaves the cavity 102.

Figure 2A:
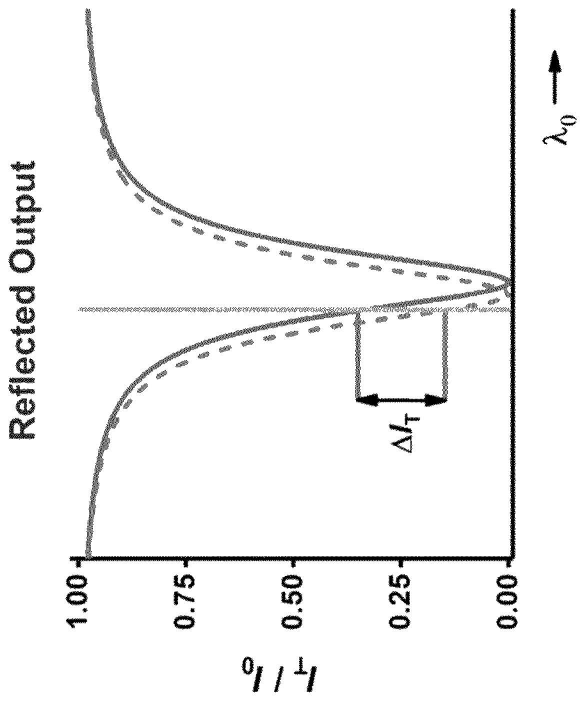
FIG. 2A schematically shows the reflected intensity of the probe laser beam in interferometric cavity-assisted photothermal spectroscopy (ICAPS).
Figure 2B:
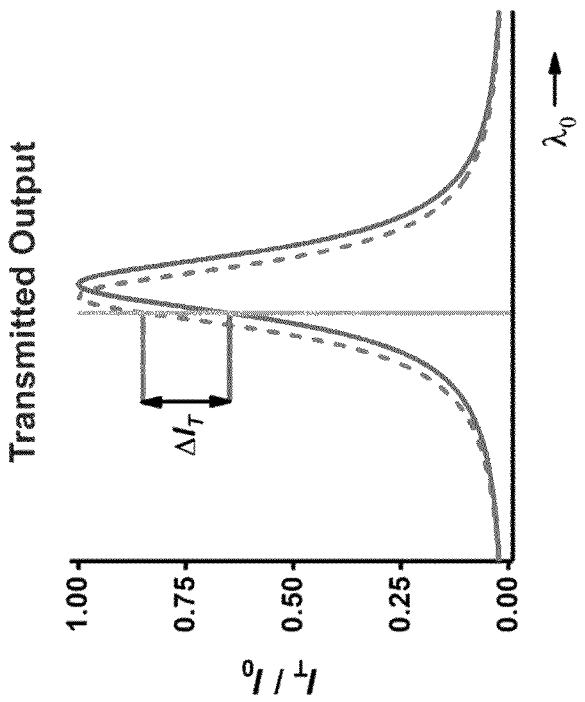
FIG. 2B schematically shows the transmitted intensity in ICAPS.

The ICAPS operation principle is shown in FIG. 2A for the reflected intensity and in FIG. 2B for the transmitted intensity. In both cases, the frequency of a probe laser (straight line) is tuned near the inflection point on one side of the cavity's resonance, incorporating sample gas at thermal equilibrium (solid trace). Photo-induced heating of the sample by an excitation laser alters the sample's refractive index, which is accompanied by a shift in the transmittance and reflectance with respect to the vacuum wavelength (dotted trace). This shift is monitored by a photodiode via a change in the detected probe laser intensity ($\Delta I_T$).

Figure 3A:
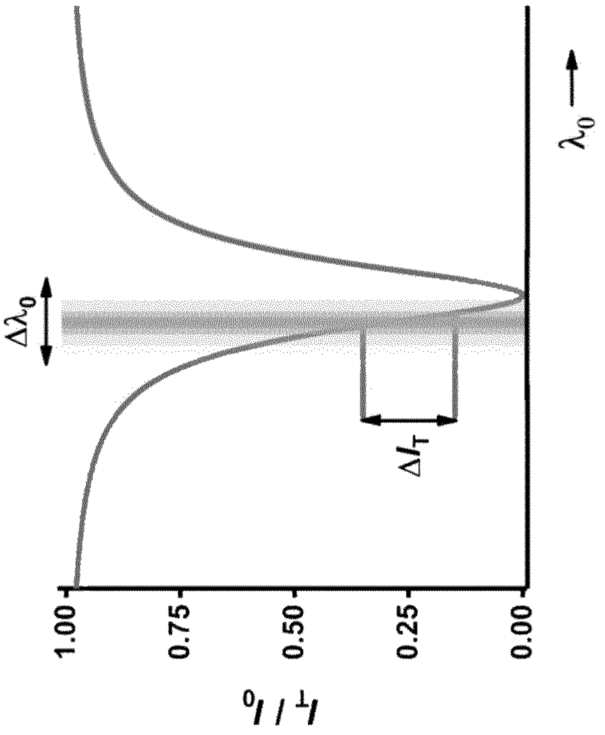
FIG. 3A schematically illustrates excess probe laser noise (frequency fluctuations) of an ICAPS setup.
Figure 3B:
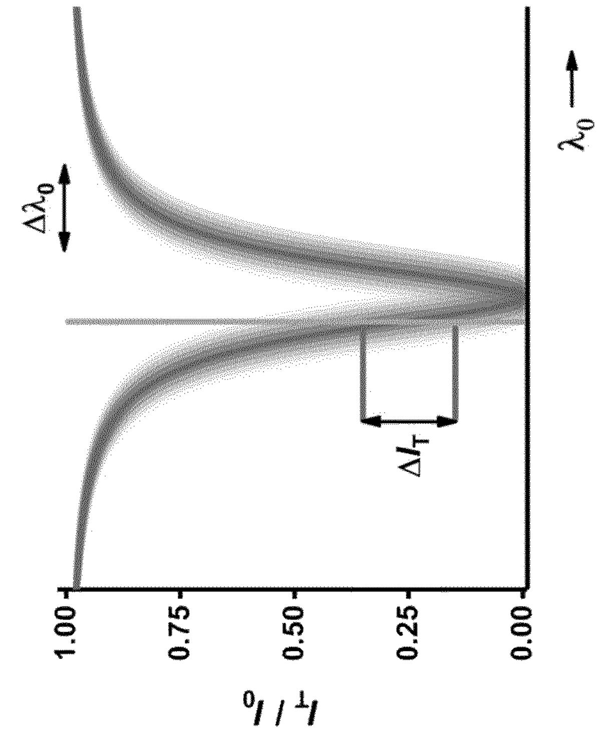
FIG. 3B schematically illustrates environmental noise (e.g. sound) of an ICAPS setup.

The different excess noise sources of an ICAPS setup are schematically illustrated in FIGS. 3A and 3B: FIG. 3A illustrates excess probe laser noise (frequency fluctuations of the probe laser beam) and FIG. 3B illustrates environmental noise (e.g. sound).

Figure 4:
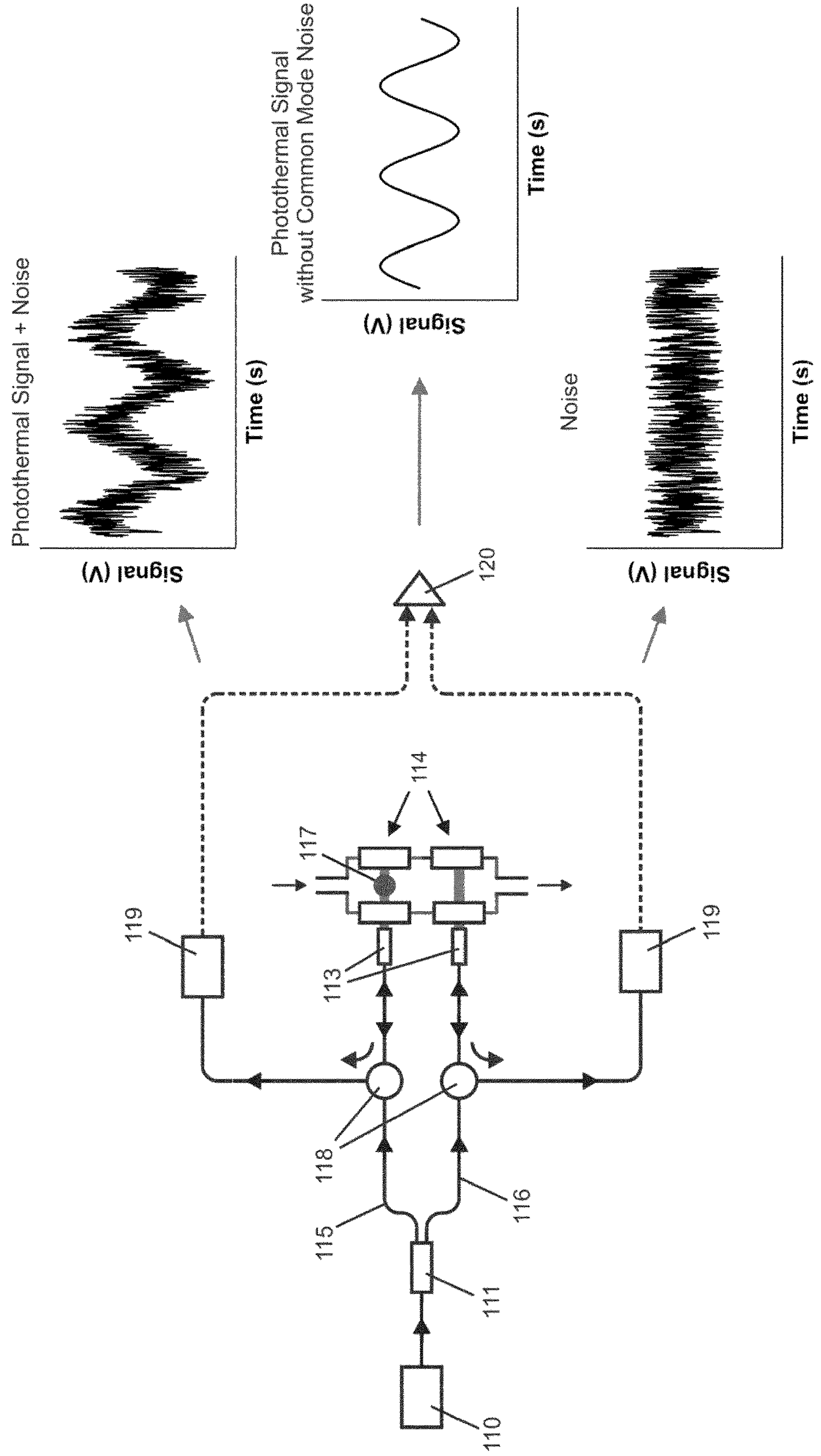
FIG. 4 schematically illustrates the principle of balanced-detection ICAPS.

FIG. 4 schematically illustrates the principle of balanced-detection ICAPS monitoring the reflectance of the interferometer in an all-fiber-coupled probe laser configuration. Solid lines with arrows illustrate the optical signal and its traveling direction; dotted lines the electrical signal. The beam from a probe laser 110 is split by beam splitter 111 into two equal part—a sample probe beam 115 and a reference probe beam 116—and is coupled by a collimator 113 each into two separate but identical interferometers 114. The sample beam 115, which intersects with an excitation beam 117, probes the photothermal signal, which is superimposed by noise, whereas the reference beam 116 probes only noise. The reflected light is again collected by the collimator 113 and separated from the forward propagating light coming from the probe laser 110 by a circulator 118, routing the beam to a photodiode 119. By subtraction of the two photodiode signals at subtractor 120, the photothermal signal is received along with high rejection of common mode noise.

Figure 5:
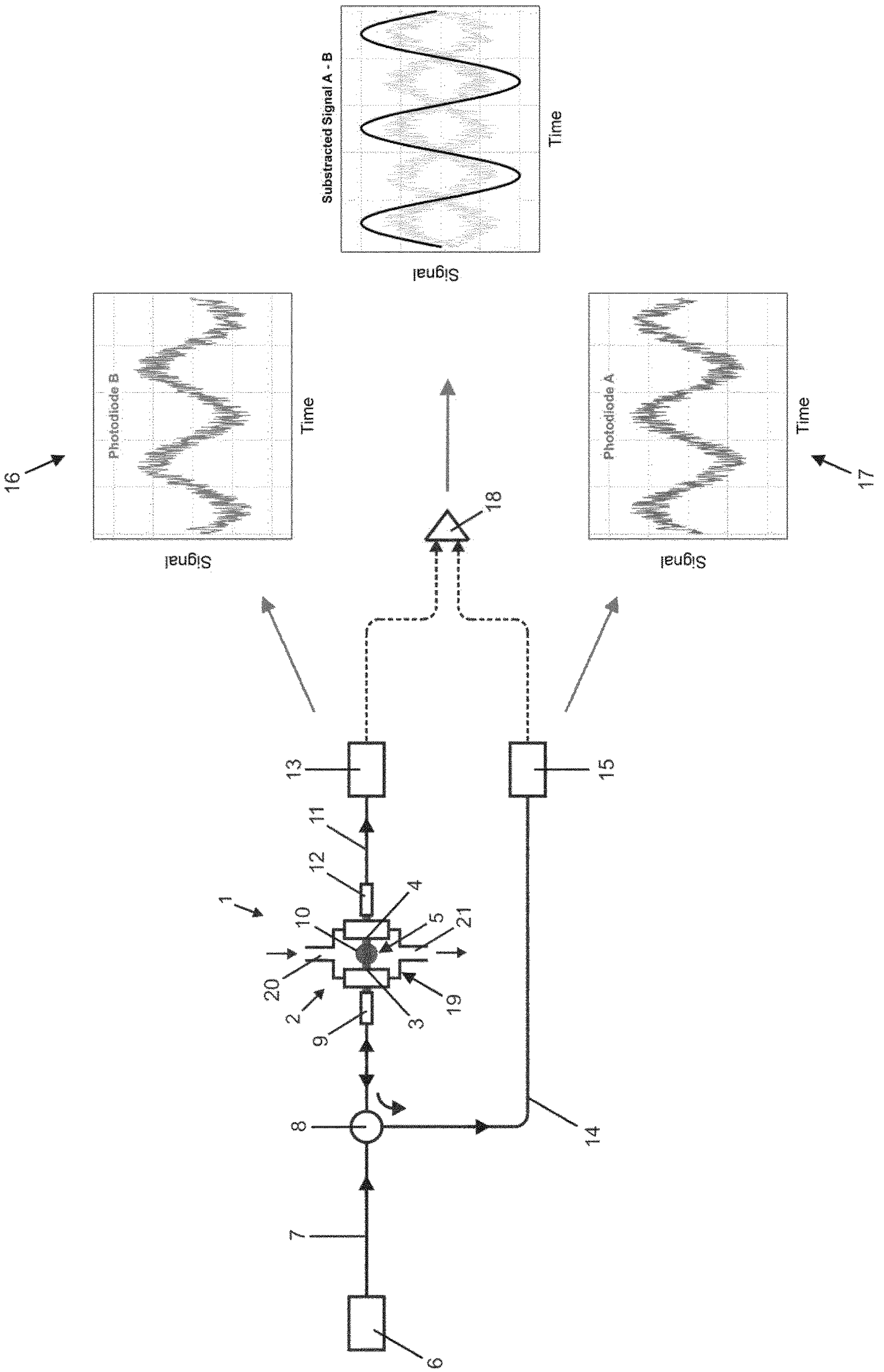
FIG. 5 schematically illustrates a preferred embodiment of the photothermal interferometer apparatus.

FIG. 5 schematically illustrates a preferred embodiment of the photothermal interferometer apparatus 1 for detecting a molecule in a sample, in particular for detecting a trace gas species. Again, optical signals and their traveling directions are indicated by solid lines and arrows, while electrical signals are indicated by dotted lines.

The apparatus 1 comprises a Fabry-Perot interferometer 2 with a first partially reflective mirror 3, a second partially reflective mirror 4 and a cavity 5 for containing the sample extending between the first mirror 3 and the second mirror 4. The device further comprises a probe laser 6 for providing a probe laser beam 7. Via an optical circulator 8, the probe laser beam is propagated in an optical fibre to a fibre-coupled collimator 9 for coupling the probe laser beam 7 into the cavity 5. Further, the apparatus 1 comprises an excitation laser (not shown) for providing an excitation laser beam 10 such that it passes through the cavity 5 and intersects with the probe laser beam 7 in the cavity 5 for exciting the molecule in the sample.

The transmitted probe laser beam 11 leaks out of the cavity 5 at the second mirror 4. It is collected by another coupler 12. A first photodetector 13 is arranged for detecting the transmitted probe laser beam 11. Further, the reflected probe laser beam 14 leaks out of the cavity 5 at the first mirror 3. The reflected probe laser beam 14 also comprises the fraction of the probe laser beam 7 that was reflected at the first mirror 3 and not coupled into the cavity 5. The fibre-coupled collimator 9 is also arranged for collecting the reflected probe laser beam 14. The optical circulator 8 is arranged both for directing the probe laser beam 7 from the probe laser 6 to the cavity 5, as mentioned above, as well as for directing the reflected probe laser beam 14 from the cavity 5 to a second photodetector 15, which is arranged for detecting the reflected probe laser beam 14.

The transmitted signal 16 corresponding to the transmitted probe laser beam 11 detected by the first photodetector 13 over time and the reflected signal 17 corresponding to the reflected probe laser beam 14 detected by the second photodetector 15 over time are illustrated. Both the transmitted signal 16 and the reflected signal 17 carry the photothermal signal, but with opposed signs, while they carry identical probe laser intensity noise.

The apparatus also comprises a subtractor 18, which in particular is a differential amplifier, for subtracting the transmitted probe laser signal 16 detected by the first photodetector 13 and the reflected probe laser signal 17 detected by the second photodetector 15. The resulting subtracted signal over time is shown in the center right. It carries the photothermal signal without common mode intensity noise. The amplitude of this detected photothermal signal is doubled compared to the probe laser signal 16 or 17. Thus, balanced detection is achieved within one single cavity, reducing the system complexity, influences of cavity drift are eliminated and the detected signal-to-noise ratio is enhanced.

In this embodiment, the Fabry-Perot interferometer 2 comprises a sample cell 19 for containing the sample, the first mirror 3 and the second mirror 4 being fixed on a first and second side of the sample cell 19. The sample cell 19 comprises a sample inlet 20, at which the sample is introduced into the sample cell 19, and a sample outlet 21, at which the sample is drawn out of the sample cell 19.

Figure 6:
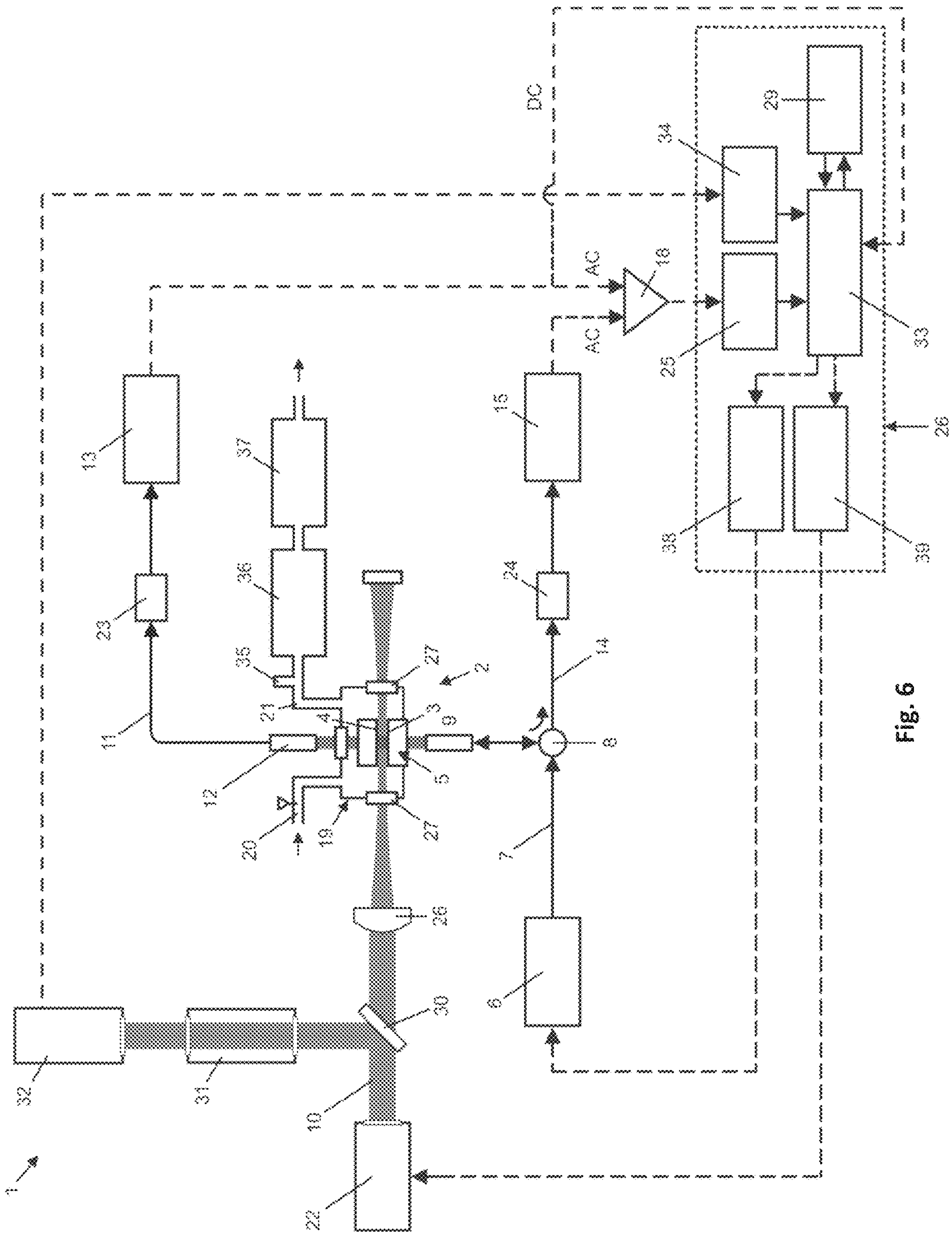
FIG. 6 schematically illustrates another preferred embodiment of the photothermal interferometer apparatus, which was also used to experimentally verify the functional principle of the present invention.

FIG. 6 schematically illustrates another preferred embodiment of the photothermal interferometer apparatus 1, which was also used to experimentally verify the functional principle of the present invention. The embodiment shown in FIG. 6 is similar to the one shown in FIG. 5 and essentially comprises all of the elements mentioned in the context of FIG. 5. Therefore, like parts have been given the same reference numerals and only the differences/additions over the embodiment shown in FIG. 5 will be mentioned.

In FIG. 6, also the excitation laser 22 for providing the excitation laser beam 10 is shown. The apparatus 1 also comprises a first attenuator 23 arranged in the path of the transmitted probe laser beam 11 between the cavity 5 and the first photodetector 13 and/or a second attenuator 24 arranged in the path of the reflected probe laser beam 14 between the cavity 5 and the second photodetector 15, in particular arranged in the path of the reflected probe laser beam 14 between the optical circulator 8 and the second photodetector 15.

In order to verify the functional principle of the present invention, the metrological figures of merit were investigated using carbon monoxide (CO) as the (target) molecule of the sample. Investigations of the enhancement of the detected photothermal signal, sensitivity, linear response and the noise cancellation performance were performed by recording spectral scans of CO via tuning the QCL frequency across the selected absorption line for balanced and non-balanced detection as well as by recording the noise when the sample cell 19 was flushed with moisturized $N_2$. Different trace gas concentration levels were obtained by blending a 100 ppmv CO calibration mixture with $N_2$ via a custom gas mixing system. The $N_2$ used for dilution was moisturized with water vapor obtaining an absolute humidity of ~2.0%. The presence of water vapor influences the response to CO by enhancing the VT energy transfer rate and thus enhances the detected photothermal signal.

Transient generation of the photothermal signals was performed by applying wavelength modulation (WM) at reduced sample pressure via a powerful continuous wave (CW) distributed feedback (DFB) quantum cascade laser (QCL) as excitation laser 22 emitting at a wavelength around 4.59 μm to target strong fundamental absorption features of the sample molecules in the mid-infrared (mid-IR) region. The induced refractive index changes were monitored by the sample probe laser 6 transversely intersecting the excitation beam 22. This layout offers simple beam alignment and avoids any heating of the FPI's first and second mirror 3, 4 by the excitation laser beam 10, thus enabling a simple, robust, and compact gas sensor design. The photo-induced transducer signal was detected within a narrow bandwidth by a lock-in amplifier (LIA) 25 of the control unit 26 at the second harmonic (2f) of the modulation frequency. This 2f-WM scheme is a powerful method for increasing the signal-to-noise ratio as well as the selectivity of a given measurement.

Refractive index changes were detected via a CW-DFB fiber laser (FL) as probe laser 6 emitting in the vicinity of 1550 nm. This near-infrared region offers mature technology and readily available high-performing optical components. High sensitivity was accomplished by application of interferometers 2 with moderate finesse as well as a small mirror spacing of 1 mm together with strong photo-thermal signal generation by use of high excitation laser intensities. The setup uses an all-fiber-coupled probe laser configuration, probing the reflectance (i.e. reflected probe laser beam 14) and transmittance (i.e. transmitted probe laser beam 11) of the same interferometer 2. The use of optical fibers greatly improves the sensor ruggedness by avoiding free-space probe laser beams and by precluding any possible mismatch in the beam guiding at the interferometer coupling/collecting interface.

The embodiment of FIG. 6 uses a single air-spaced optical cavity 5, consisting of two fused silica plates (10×5×2 mm) on which dielectric-coated mirrors with a reflectivity of R=0.989 are deposited as first and second mirror 3, 4. The mirrors 3, 4 are separated by spacers of 1 mm thickness. The cavity 5 was simultaneously used as the transducer for monitoring induced changes in the refractive index, as well as the reference to apply balanced detection. Photothermal-induced refractive index changes inside the cavity 5 were monitored via a fiber-coupled, single-mode tunable CW-DFB-FL (probe laser 6). The probe laser 6 emitted a probe laser beam 7 at a wavelength of ~1550 nm with a constant optical output power of 40 mW; its wavelength could be thermally tuned within a total range of ~1.2 nm by a laser driver 38. The fiber-coupled output beam (probe laser beam 7) of the probe laser 6 was routed through a fiber-coupled optical circulator 8 whose corresponding port was coupled to a pigtailed gradient-index (GRIN) fiber-optic collimator 9 (working distance, WD=15 mm, beam diameter at WD=0.5 mm FWHM). This collimator 9 served to couple the forward traveling light into the cavity 5 and the reflected, backward travelling light (i.e. the reflected probe laser beam 14 again into the fiber.

The reflected light 14 was separated from the forward traveling light by the circulator 8 and sent to the second photodetector 15. The transmitted probe laser beam 11 was also coupled by a further coupler 12 into an optical fiber and sent to the second photodetector 13. Both the first and the second photodetector 13, 15 comprise a gallium indium arsenide (GaInAs) positive intrinsic negative junction (PIN) photodiode amplifying the signal via a trans-impedance amplifier (TIA, not shown). The intensities of these individually transmitted and reflected probe laser beams 11, 14 were adjusted by fiber-coupled attenuators 23, 24 ahead of the photodetectors 13, 15 to avoid saturation. At the sensor's operation point the intensity of the transmitted and reflected probe laser beam 11, 14 was identical. This yielded the same response of intensity noise in both channels.

The electronic outputs of the photodiodes 13, 15 were passed to a 4th order Gaussian high-pass filter (which is one element with the subtractor 18) with a 3 dB cut-off frequency of 200 Hz and a low-noise differential amplifier (as subtractor 18) with a gain of 100, whose output was fed into a lock-in amplifier (LIA) 25. The probe laser emission frequency was maintained at the operation point of the cavity's (5) resonance via a slow feedback circuit (mHz), by using the DC component of the first photodetector 13, which monitored the transmitted probe laser beam intensity. By monitoring the DC-component and adjusting the probe laser frequency, any drift of the transducer, e.g., due to temperature or changing sample gas composition, or drift of the emitted laser frequency itself was automatically compensated. The interferometer 2 was fixed into a compact and gas-tight aluminium sample cell 19. Transmission of the probe laser beam 7 was enabled directly by the interferometer substrates and a fused silica window, respectively, transmission of the QCL beam (excitation laser beam 10) through the sample cell 19 was enabled by two CaF2 windows 27. Sample gas exchange was performed via sample gas in—and outlets 20, 21. The outer dimensions of the sample cell 19 were 32×18×30 mm with a total inner sample gas volume of a few $cm^3$.

Selective heating of the sample gas inside the interferometer 2 was performed by using a collimated, high heat load (HHL) packaged CW-DFB-QCL excitation laser 22 emitting at a wavelength of 4.59 μm, whose frequency could be tuned by varying the QCL temperature via injection current and temperature control by a Peltier element by a laser driver 39. The QCL output beam (excitation laser beam 10) was focused by a plano-convex CaF2 lens 28 (f=50 mm) between the two mirrors 3, 4 forming the cavity 5 to induce strong photothermal excitation via the high laser intensity, intersecting the standing wave of the probe laser beam 7 in the transverse direction.

The sensor platform was based on photothermal sample excitation via wavelength modulation and detection of the second harmonic (2f) by demodulation of the alternating current (AC) component of the differentially amplified photodetector signals 16, 17, i.e., the balanced signal, using an LIA 25. The digitized electronic signals were transferred to a computer 29 via data acquisition and processing unit 33 for further data processing in a LabVIEW-based program.

The QCL output beam was split by a beam splitter 30 (97:3), whose low power part was guided through a reference cell 31 filled with CO in $N_2$ at reduced pressure, and finally onto a pyroelectric photodetector 32. The reference gas cell 31 and the photodetector 32 were used as the reference channel to monitor the emitted excitation laser 22 wavelength feeding the detector 32 signal to another LIA 34. The ICAPS detection was performed in scan mode, where spectra of the sample gas were acquired by slowly tuning (mHz) the excitation laser frequency over the desired spectral range around the target absorption line through a change of the DC injection current component using a sawtooth function. To implement the WM technique, the emission wavelength of the excitation laser 22 was modulated by adding a sinusoidal function to the DC injection current input. The detected probe laser beam intensity was modulated when the temperature of the gas inside the cavity 5 was altered via absorption of the excitation laser radiation by the target molecules.

The pressure and flow of the sample gas inside the sample cell 19 were controlled and maintained by using a metering valve, pressure sensor 35, pressure controller 36, and mini diaphragm vacuum pump 37. The metrological figures of merit for the presented apparatus 1 were investigated by employing a modulation frequency of $f_{mod}$=297 Hz, a modulation depth of $\Delta\upsilon=\pm0.09\ cm^{-1}$, an LIA time constant set to τ=1 s, and a sawtooth excitation laser tuning frequency of f=6.67 mHz. The absolute pressure and flow of the sample gas was kept constant at p=850 mbar and u=25 mL $min^{-1}$.

Figure 7:
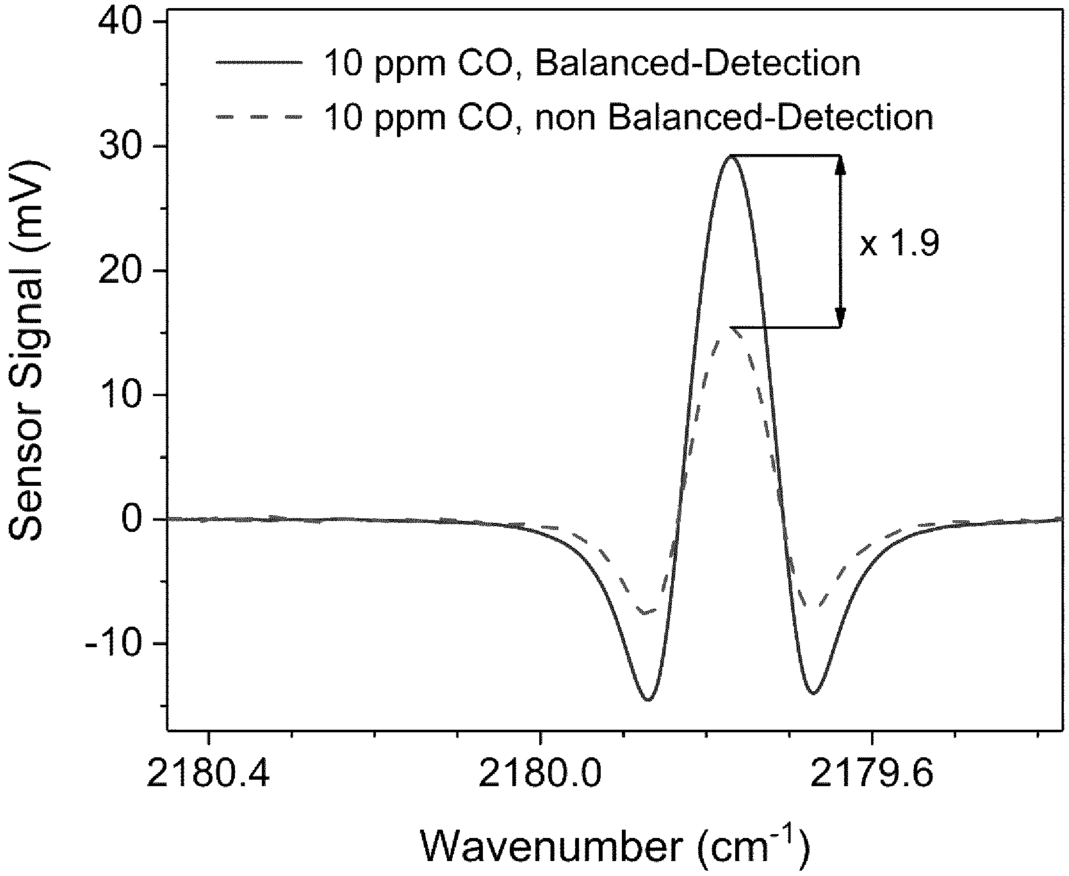
FIG. 7 shows the spectra of a sample gas, once acquired according to the present invention and once acquired in a non balanced detection mode.

To investigate the enhancement of the detected photothermal signal via balanced-detection within a single cavity 5 two spectra of 10 ppmv CO in moisturized $N_2$ were acquired: once in the balanced-detection mode, i.e. according to the present invention, and once in the non balanced-detection mode (see FIG. 7). (Non balanced-detection refers to the use of only the transmitted or the reflected signal. In this setup, the reflected signal was used.) The results show an improved signal by a factor of approximately 1.9 using balanced-detection. The discrepancy from theoretical enhancement by a factor of 2 occurs due to a slightly reduced total height of the reflected resonance profile.

In particular, FIG. 7 shows the 2f-WM ICAPS sensor response for non balanced-detection and balanced-detection within a single cavity when the excitation laser 22 was tuned across the targeted absorption band centered at 2179.77 $cm^{-1}$ at an absolute pressure of 850 mbar.

Figure 8:
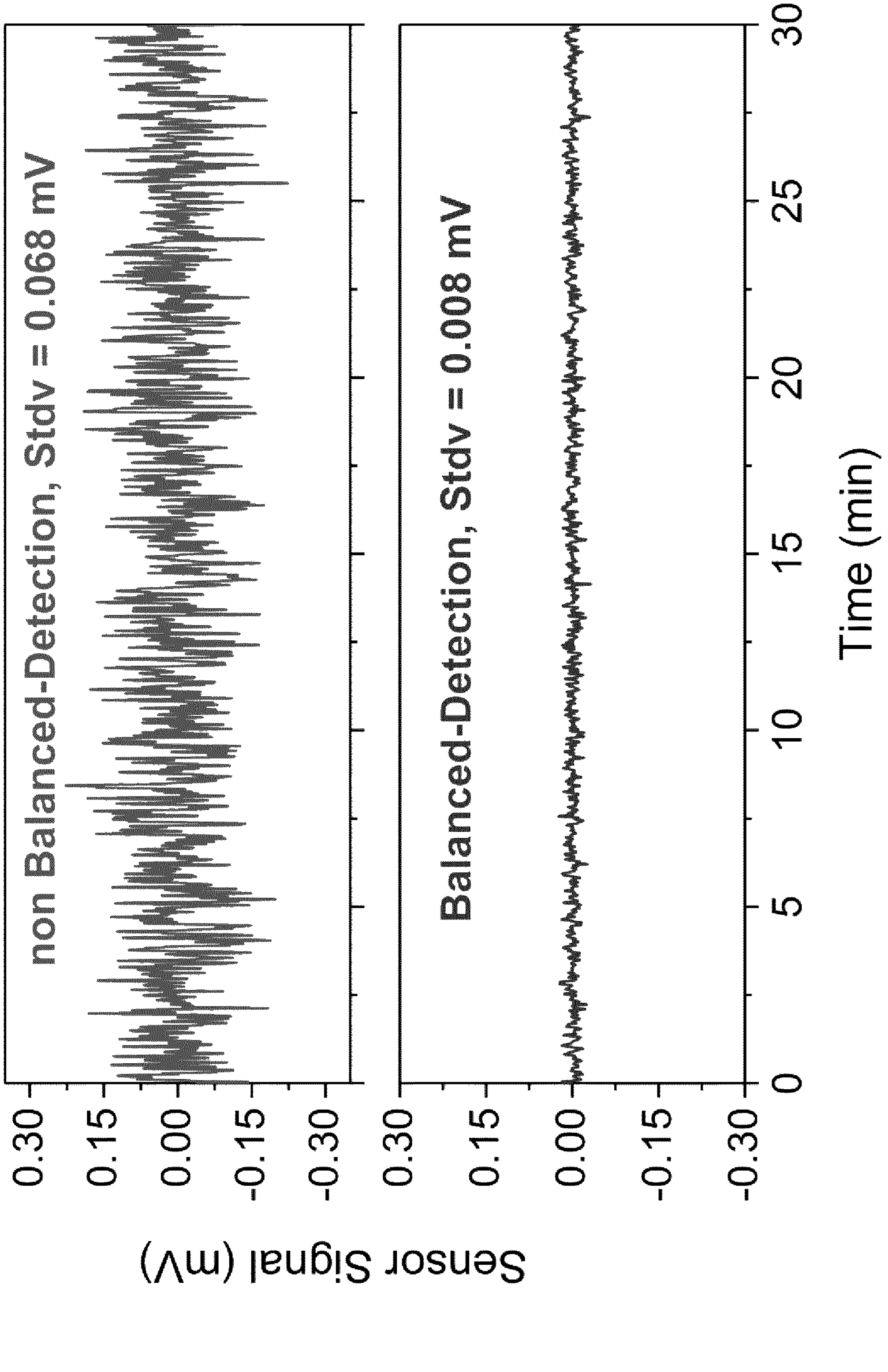
FIG. 8 illustrates the improvement in noise achieved by one embodiment the present invention.

To investigate the noise cancellation performance of the present invention (labelled as balanced-detection (within a single cavity)) and thus the improvement in the signal-to-noise ratio of the balanced-detection scheme, the noise floor of the sensor was recorded for a total duration of 30 min when the cell was flushed with moisturized $N_2$. Comparison of the calculated standard deviation of the measured data show a noise reduction by a factor of approximately 9 for the balanced-detection scheme, see FIG. 8. In particular, FIG. 8 shows the 2f-WM ICAPS sensor response for non balanced-detection and balanced-detection within a single cavity for moisturized $N_2$ when the excitation laser 22 was kept at 2179.77 $cm^{-1}$ at an absolute sample pressure of 850 mbar.

Based on the signal amplitudes for 10 ppmv CO and the standard deviations of the noise level for moisturized $N_2$, a signal-to-noise ratio of ~226 and ~3816 was calculated for non balanced-detection and balanced-detection, respectively. By applying the present invention an improvement in the signal-to-noise ratio by a factor of ~16.9 was achieved, which yielded a 1σ minimum detection limit (MDL) of 2.6 ppbv for an acquisition time of 1 s. This improvement in the signal-to-noise ratio is composed by the enhancement in the detected signal (×1.88) and the improvement in noise (×9), when employing balanced-detection ICAPS within a single cavity.

Figure 9:
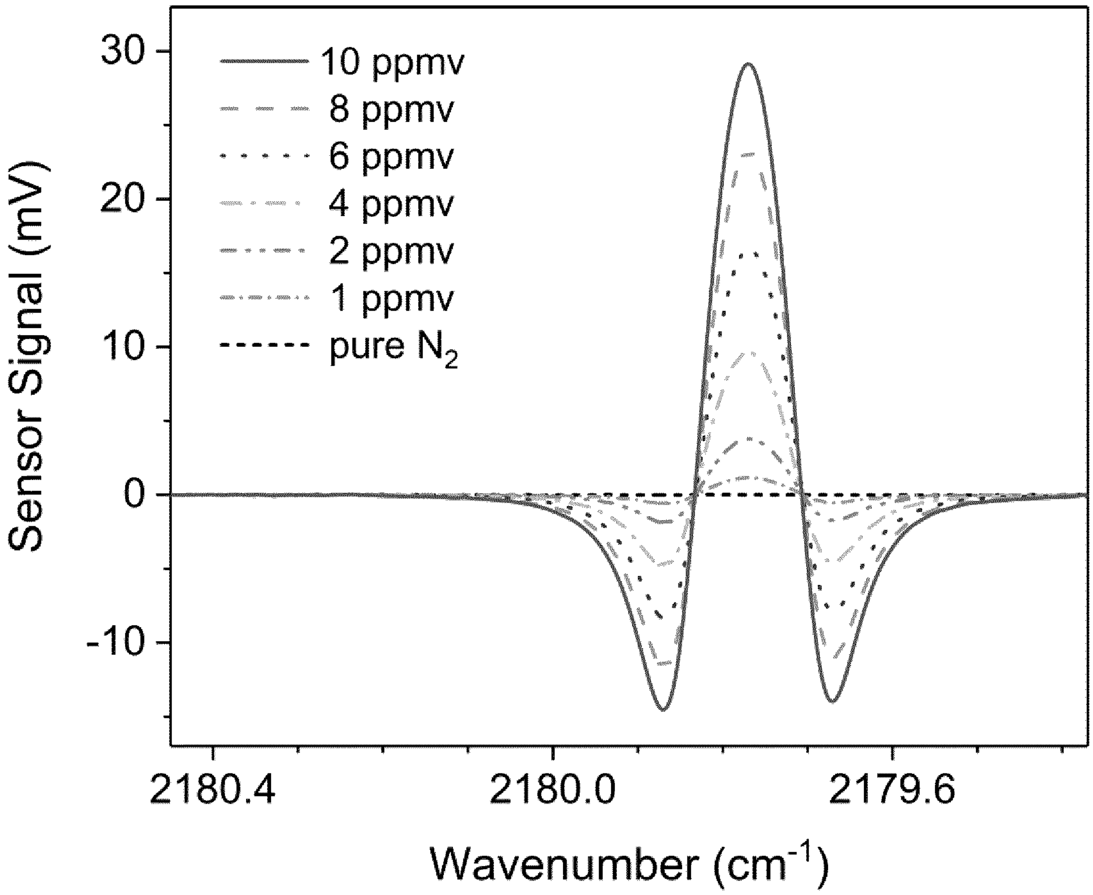
FIG. 9 shows the relationship between the target molecule concentration and the sensor signal.

The selective response and linearity of the sensor response to various concentrations of CO in moisturized $N_2$ was verified by recording 2f-WM spectra for six different trace gas levels (1, 2, 4, 6, 8 and 10 parts per million by volume, ppbm) as well as the noise floor of the sensor for moisturized $N_2$ (see FIG. 9). The measured data for each concentration level yielded excellent linearity between signal amplitudes and the CO concentrations (see inset of FIG. 10).

Figure 10:
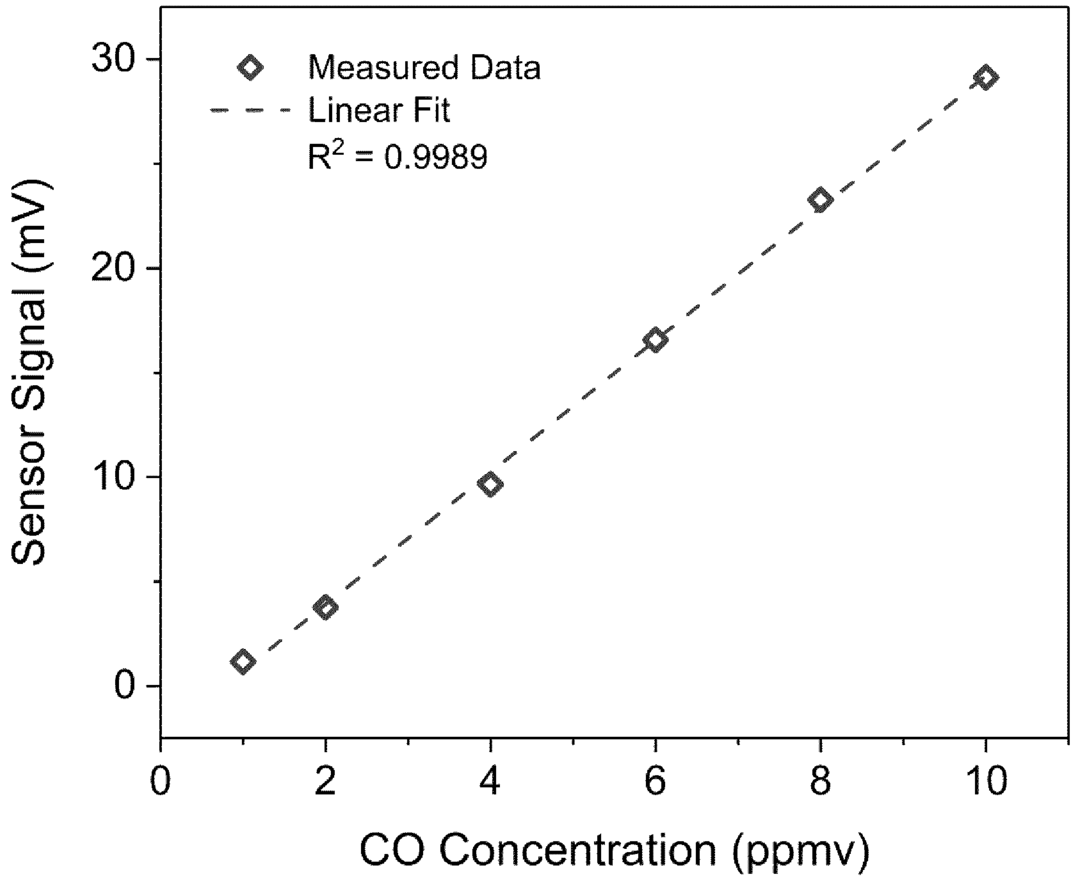
FIG. 10 shows the measured signal amplitude as a function of the target molecule concentration.

In particular, FIG. 9 shows the 2f-WM single-cavity balanced-detection ICAPS sensor response for six different CO gas concentrations in moisturized $N_2$ (absolute humidity=2.0% $H_2O$), as well as the sensor noise floor for moisturized $N_2$, recorded when the QCL frequency was tuned over the targeted absorption band centered at 2179.77 $cm^{-1}$ at an absolute pressure of 850 mbar. FIG. 10 shows the measured signal amplitudes as a function of Co concentration, showing linear sensor performance to varying sample gas concentration levels.

The invention claimed is:

1. A method for detecting a molecule, in particular a trace gas species, in a sample using photothermal spectroscopy comprising the steps of:
- providing a probe laser beam and propagating the probe laser beam to a cavity of a Fabry-Perot interferometer;
- directing the probe laser beam through the sample in the cavity;
- providing an excitation laser beam for heating the sample in the cavity;
- directing the excitation laser beam through the sample in the cavity;
- detecting the transmitted probe laser beam, which was transmitted from the cavity;
- detecting the reflected probe laser beam, which was reflected from the cavity; and
- adjusting the transmitted probe laser beam by a first attenuator and/or the reflected probe laser beam by a second attenuator such that the transmitted probe laser beam and the reflected probe laser beam have the same power values, prior to detecting the transmitted probe laser beam and the reflected probe laser beam.

2. The method according to claim 1, wherein the probe laser beam propagating to the cavity is separated from the reflected probe laser beam by an optical circulator.

3. The method according to claim 1, wherein the probe laser beam is propagated to the cavity at least in a section in an optical fibre.

4. The method according to claim 3, wherein the probe laser beam propagating to the cavity is coupled into the cavity by a fibre-coupled collimator and the reflected probe laser beam is collected by the same fibre-coupled collimator.

5. The method according to claim 1, further comprising tuning the probe laser beam to a frequency, at which the transmitted probe laser beam and the reflected probe laser beam have the same power.

6. The method according to claim 1, further comprising the step of subtracting a transmitted signal corresponding to the transmitted probe laser beam and a reflected signal corresponding to the reflected probe laser beam.

7. The method according to claim 1, further comprising the step of:
- tuning the probe laser beam to a partial transmission or a partial reflection of one side of a resonance of the cavity.

8. The method according to claim 1, further comprising the steps of:
- modulating the excitation laser beam wavelength, wherein the modulated excitation laser beam is directed through the sample in the cavity; and
- detecting a harmonic, in particular a second harmonic, of a modulation of the transmitted probe laser beam and detecting a harmonic, in particular a second harmonic, of a modulation of the reflected probe laser beam.

9. The method according to claim 1, further comprising the steps of:
- providing a further probe laser beam and propagating the further probe laser beam to a further cavity of the Fabry-Perot interferometer;
- directing the further probe laser beam through the sample in the further cavity;
- detecting the transmitted further probe laser beam, which was transmitted from the further cavity; and
- detecting the reflected further probe laser beam, which was reflected from the further cavity.

10. A photothermal interferometry apparatus for detecting a molecule in a sample, in particular for detecting a trace gas species, comprising:
- a Fabry-Perot interferometer with a first partially reflective mirror, a second partially reflective mirror and a cavity for containing the sample extending between the first mirror and the second mirror;
- a probe laser for providing a probe laser beam;
- an excitation laser for passing an excitation laser beam through the cavity such that it intersects with the probe laser beam in the cavity for exciting the molecule in the sample;
- a first photodetector arranged for detecting a transmitted probe laser beam, which was transmitted from the cavity;
- a second photodetector arranged for detecting a reflected probe laser beam, which was reflected from the cavity; and
- a first attenuator arranged in the path of the transmitted probe laser beam between the cavity and the first photodetector and/or a second attenuator arranged in the path of the reflected probe laser beam between the cavity and the second photodetector, such that the transmitted probe laser beam is adjusted by the first attenuator and/or the reflected probe laser beam is adjusted by the second attenuator such that the transmitted probe laser beam and the reflected probe laser beam have the same power values, prior to detecting the transmitted probe laser beam and the reflected probe laser beam.

11. The photothermal interferometry apparatus according to claim 10, comprising an optical circulator arranged for directing the probe laser beam from the probe laser to the cavity and for directing the reflected probe laser beam from the cavity to the second photodetector.

12. The photothermal interferometry apparatus according to claim 10, comprising an optical fibre which is arranged for at least in a section propagating the probe laser beam from the probe laser to the cavity.

13. The photothermal interferometry apparatus according to claim 12, comprising a fibre-coupled collimator for coupling the probe laser beam into the cavity and for collecting the reflected probe laser beam.

14. The photothermal interferometry apparatus according to claim 10, wherein the Fabry-Perot interferometer comprises a sample cell for containing the sample, the first mirror and the second mirror being fixed on a first and second side of the sample cell, wherein optionally the sample cell comprises a sample inlet and a sample outlet.

15. The photothermal interferometry apparatus according to claim 10, comprising a subtractor, in particular a differential amplifier, for subtracting a probe laser signal detected by the first photodetector and a reflected probe laser signal detected by the second photodetector.

16. The photothermal interferometer apparatus according to claim 10, wherein the first attenuator is a variable value attenuator and/or the second attenuator is a variable value attenuator.

17. The photothermal interferometer apparatus according to claim 10, comprising a tuner for tuning the probe laser beam over a given wavelength range.

18. The photothermal interferometer apparatus according to claim 10, comprising:

a modulator for modulating the wavelength of the excitation laser beam, the first photodetector being arranged for detecting a modulation of the transmitted probe laser beam, the second photodetector being arranged for detecting a modulation of the reflected probe laser beam; and a control unit arranged for communicating with the first photodetector and the second photodetector and arranged for determining a harmonic, in particular a second harmonic, of the modulation of the transmitted probe laser beam and the reflected probe laser beam, wherein the control unit optionally comprises a lock-in amplifier.

* * * * *